United States Patent [19]
Baermann

[11] 3,814,962
[45] June 4, 1974

[54] MAGNETIC WORM DRIVE

[76] Inventor: Max Baermann, Bezirk, Koln, 506 Bensberg, Wulshof, Germany

[22] Filed: Nov. 22, 1972

[21] Appl. No.: 308,682

[30] Foreign Application Priority Data
Dec. 2, 1971  Germany............................ 2159753

[52] U.S. Cl. ............................................. 310/103
[51] Int. Cl. .......................................... H02k 49/10
[58] Field of Search ......... 310/103, 104, 83, 80, 43; 58/116 M, 116

[56] References Cited
UNITED STATES PATENTS
1,337,732  4/1920  Stoller................................ 310/103
2,096,906  10/1937  Lilja.................................. 310/103 X
2,243,555  5/1941  Faus................................... 310/103

FOREIGN PATENTS OR APPLICATIONS
1,088,390  10/1967  Great Britain..................... 310/103

Primary Examiner—D. F. Duggan
Attorney, Agent, or Firm—Meyer, Tilberry & Body

[57] ABSTRACT

A magnetic worm gear drive includes a worm gear having a helical tooth of permanent magnet material. A worm wheel has a plurality of circumferentially spaced teeth of permanent magnet material. The teeth on the worm wheel interdigitate with the tooth on the worm gear. The teeth are magnetized so that like poles on the worm gear tooth and worm wheel teeth face one another. Rotation of the worm gear causes rotation of the worm wheel by magnetic repulsion.

11 Claims, 6 Drawing Figures

3,814,962

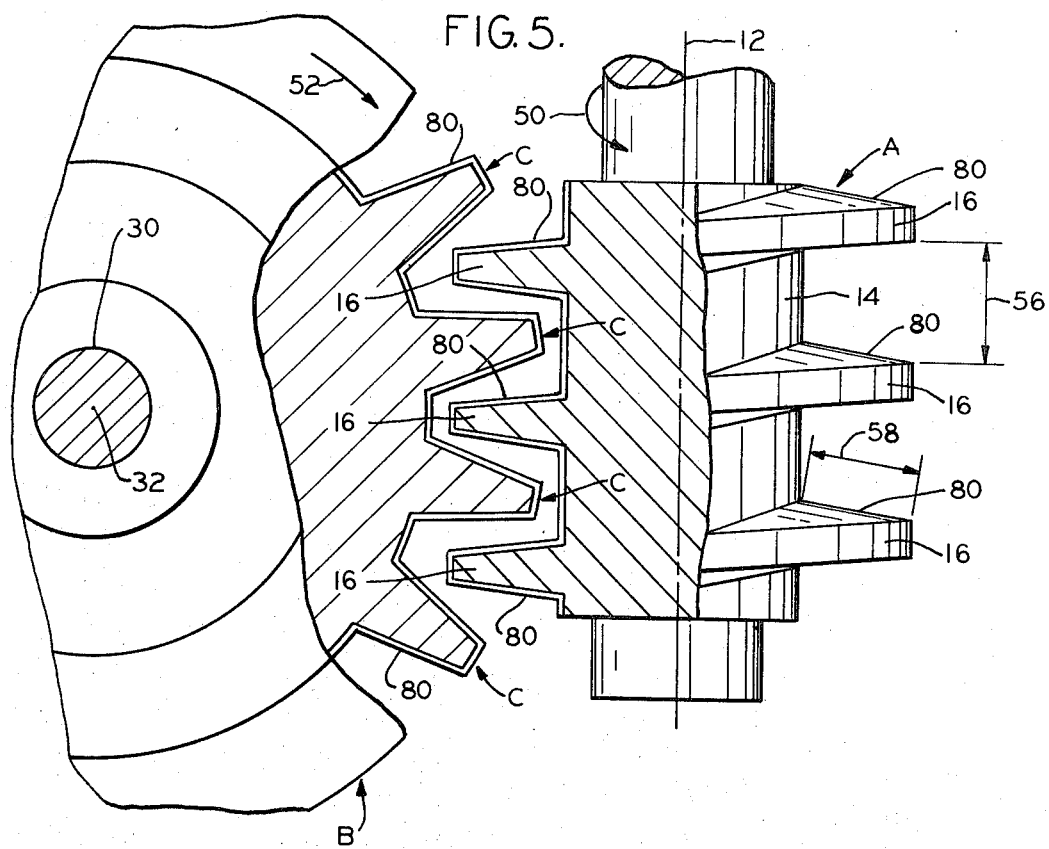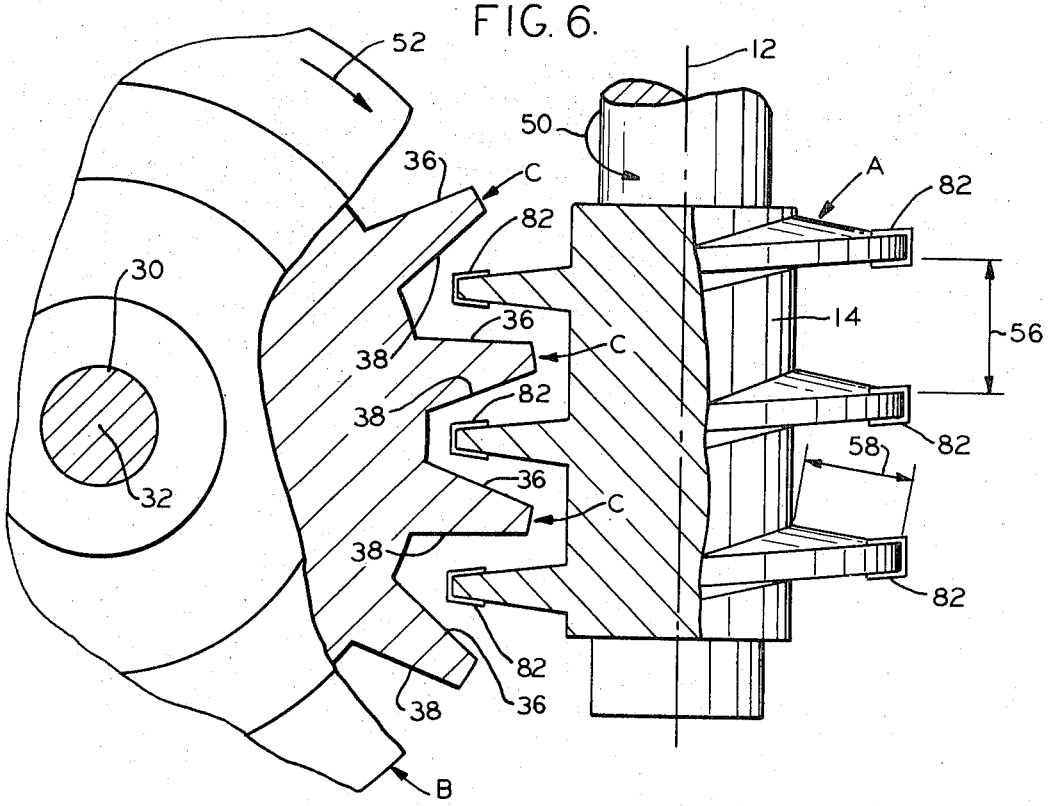

MAGNETIC WORM DRIVE

BACKGROUND OF THE INVENTION

This application pertains to the art of magnetic drives for transmitting torque from one shaft to another. More specifically, the application pertains to a magnetic worm gear drive. The invention is particularly applicable for use in changing a very high rate of revolution on one shaft to a relatively low rate of revolution on another shaft. The invention is particularly applicable for driving an integrating device in electricity meters. However, it will be recognized that the invention has broader applications and may be used for transmitting torque in other devices.

Magnetic drives of a known type include a pair of disc or cylinder-shaped permanent magnets provided with magnetic poles of alternating polarity on their peripheries. The magnets are arranged with their poles opposite one another so that their attractive forces are capable of transmitting torque from one shaft to another without having a mechanical connection between the magnets. In such devices, the permanent magnets are usually formed of magnetic material having a high coercive force, such as barium-ferrite. The magnetic properties of such material remain stable under demagnetizing influences. In devices of this type, there is an uncontrollable slip when the driven shaft is overloaded. In addition, magnetic drives operating on the principle of mutual attraction between opposite magnetic poles produce axial and radial forces acting upon the bearings which increases friction and wear. This is particularly true where such drives are used in electricity meters and other precision drives.

SUMMARY OF THE INVENTION

A magnetic worm gear drive includes a worm gear having a helical tooth of permanent magnet material. The helical tooth has opposite side surface portions, an outer portion and a base portion. A worm wheel for cooperation with the worm gear includes a plurality of circumferentially spaced teeth of permanent magnet material. The tooth on the worm gear interdigitates with the teeth on the worm wheel. The worm gear tooth and the worm wheel teeth are magnetized so that like poles face one another. Rotation of the worm gear then drives the worm wheel by magnetic repulsion.

With the arrangement described, an overload on the driven shaft connected with the worm wheel will allow the worm gear tooth to engage the worm wheel teeth and momentarily provide a mechanical driving connection until the overload is reduced.

In accordance with a preferred arrangement, the worm gear tooth and worm teeth are formed of anisotropic permanent magnet material. With a drive of the type described, the repulsive forces become stronger as the sides of the worm gear tooth approach closer to the sides of the worm wheel teeth. The arrangement described provides a frictionless transfer of torque operating solely on magnetic forces.

In order to magnetically transfer as high a torque as possible without any mechanical contact, the worm gear should have as great a diameter as possible. The pitch of the worm gear tooth should also be as great as possible, and the radially projecting width of the worm gear tooth should be as great as possible. In addition, the worm wheel should be as wide as possible in its axial direction. With such a design, large effective pole surfaces can be obtained. This makes it possible to provide correspondingly high repulsive forces.

The magnetic worm gear drive of the present invention preferably uses permanent magnet material having a very high coercive force. Such materials include oxides of iron combined with one of the oxides of barium, strontium or lead. Permanent magnet material including alloys of manganese-aluminum or alloys of rare earths can also be used.

In accordance with one arrangement, the surfaces of the worm gear tooth and worm wheel teeth are covered by a coating of wear resistant non-magnetic material so that the drive can briefly transfer torque mechanically without damage.

In accordance with another arrangement, it is possible to place a binding of non-magnetic metal or fiberglass reinforced plastic over the outer surfaces of the worm gear tooth for holding the tooth together against action of centrifugal force at high rates of rotation.

It is a principal object of the present invention to provide an improved magnetic drive for transmitting torque from one drive shaft to the driven shaft.

It is another object of the present invention to provide an improved magnetic worm gear drive.

It is an additional object of the present invention to provide a magnetic drive which is also capable of transferring torque mechanically when the driven shaft is overloaded.

BRIEF DESCRIPTION OF THE DRAWING

The invention may take form in certain parts and arrangements of parts, preferred embodiments of which will be described in detail and illustrated in the accompanying drawing which forms a part hereof.

FIG. 5 is a view similar to FIG. 1 showing a coating over the gear teeth; and

FIG. 6 is a view similar to FIG. 1 showing a reinforcing binding over the gear teeth.

DESCRIPTION OF PREFERRED EMBODIMENTS

Figure 1:
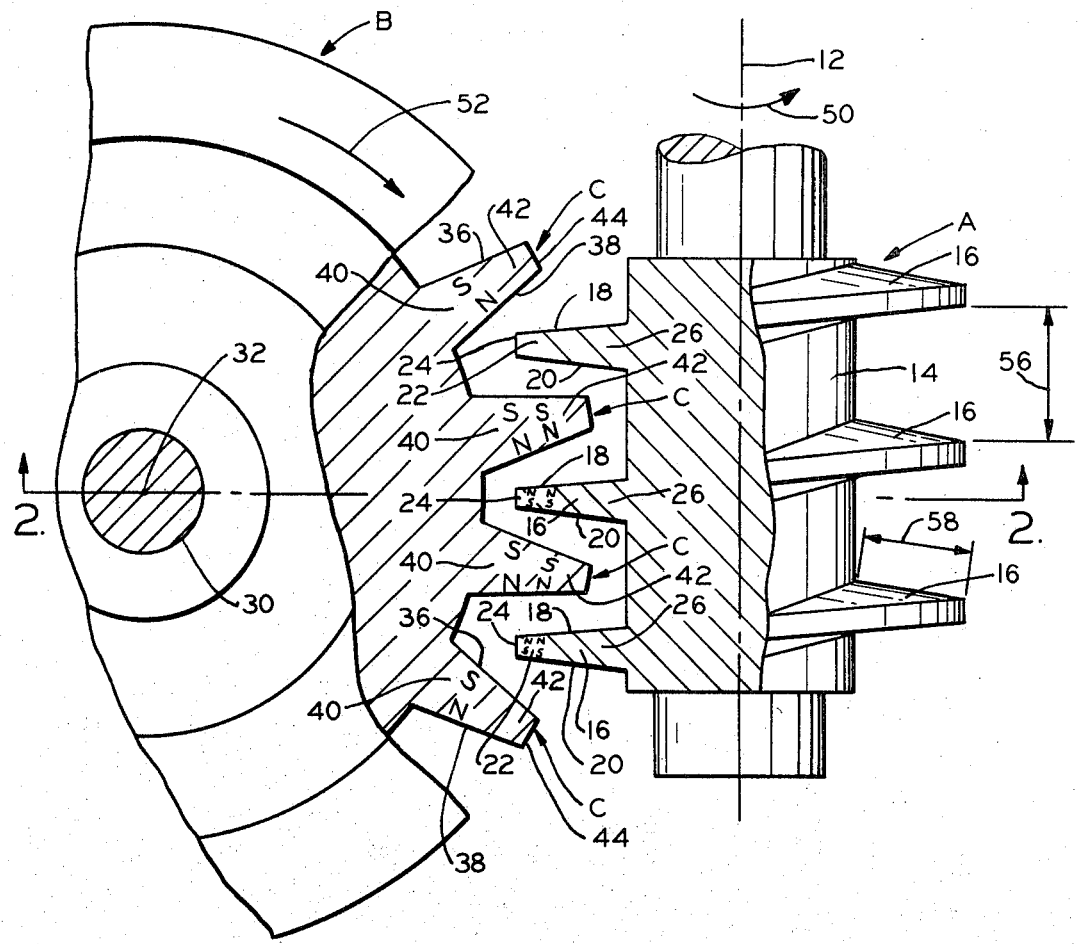
FIG. 1 is a plan view of a magnetic worm gear drive constructed in accordance with the present invention.

Referring now to the drawings, wherein the showings are for purposes of illustrating a preferred embodiment of the invention only and not for purposes of limiting same, FIG. 1 shows a worm gear A mounted on a drive shaft 10 rotatable about a longitudinal axis 12.

Worm gear A includes a core or hub portion 14 and a continuous helical worm gear tooth 16. Worm gear tooth 16 includes opposite side surface portions 18 and 20. Tooth 16 further includes an outer portion 22 having an outer surface 24 and a base portion 26 adjacent hub portion 14.

Worm gear A is preferably molded of anisotropic permanent magnet powder mixed with a thermoplastic binder. Worm gear A is then molded or pressed from the mixture in a known manner.

Worm gear tooth 16 is magnetized so that the entire surface of side surface 18 defines a north magnetic pole, while the entire surface of side surface portion 20 defines a south magnetic pole. Thus, worm gear tooth 16 is provided with at least a pair of continuous helical magnetic poles of opposite polarity. Magnetic force extends around outer surface 24 between the opposite poles and projects outwardly of surfaces 18 and 20.

A worm wheel B is provided for cooperation with worm gear A. Worm wheel B is mounted on a rotatable driven shaft 30 rotatable about a longitudinal axis 32 extending substantially perpendicular to axis 12. Worm wheel B includes a plurality of circumferentially spaced worm wheel teeth C. Each tooth C has opposite side surfaces 36 and 38. Each tooth C further includes a base portion 40, an outer portion 42 and an outer surface 44. Opposite side surfaces 36 and 38 extend substantially parallel to longitudinal axis 32. Each tooth C is magnetized so that the entire surface of side surface 38 defines a north magnetic pole, while the entire surface of side surface 36 defines a south magnetic pole.

Tooth 16 on worm gear A is interdigitated with teeth C on worm wheel B as shown in FIG. 1. The space between side surfaces 36 and 38 on adjacent teeth C is substantially greater than the axial thickness of tooth 16 in a direction parallel to axis 12. Thus, there is normally no contact between tooth 16 and teeth C. Lines of magnetic force extend between the opposite magnetic poles on side surfaces 36 and 38 of each tooth C and also project outwardly of side surfaces 36 and 38. The lines of magnetic force extending between the poles of opposite polarity on tooth 16 and teeth C repulse one another so that driven rotation of worm gear A transmits repulsive torque for drivingly rotating worm wheel B. When worm gear A is driven in the direction of arrow 50, worm wheel B will rotate in the direction of arrow 52. Poles of like polarity on tooth 16 and teeth C face one another to provide the repulsive force. Due to the helical shape of tooth 16, rotation of gear A causes side surface 20 to move closer toward side surface 36 and provide the repulsive force which rotates worm wheel B in the direction of arrow 52.

In the preferred arrangement, tooth 16 has a pitch 56 which is extremely large as compared with normal worm gears. Tooth 16 also has a radial dimension 58 which is extremely large. Thus, diameter 60 of worm gear A is also very large. Worm wheel B also preferably has a very large axial dimension 62. This arrangement provides large surfaces on which the magnetic poles are situated and the repulsive force is very high.

Figure 2:
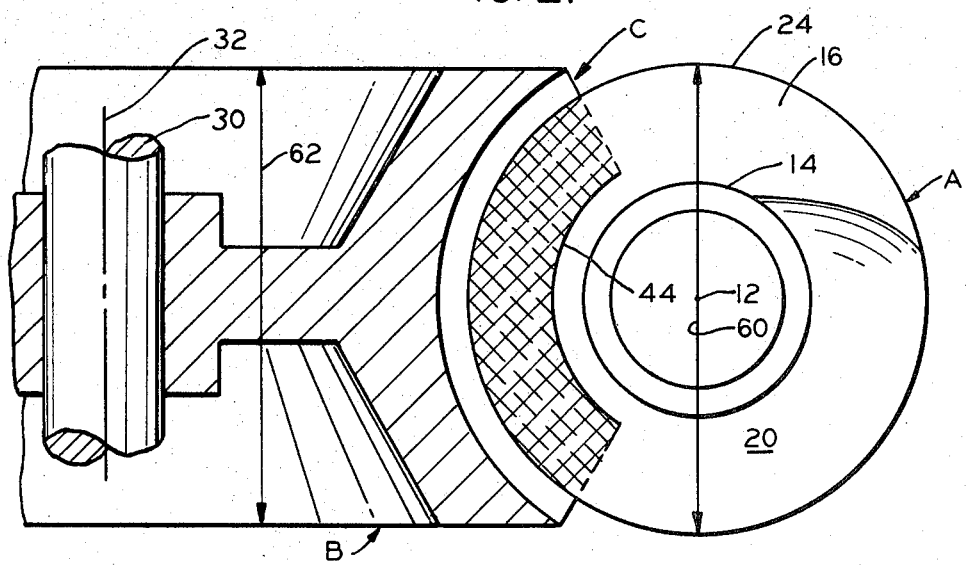
FIG. 2 is a cross-sectional elevational view looking generally in the direction of arrows 2—2 of FIG. 1.

As shown in FIG. 2, teeth C are also preferably transversely curved. That is, outer surfaces 44 of teeth C lie on the periphery of a circle having its center at axis 12. The base portions of each tooth C also lie on the periphery of circles having centers at axis 12.

The worm wheel and worm gear are pressed or molded under a magnetic aligning field. The gears are preferably formed from a mixture of anisotropic permanent magnet material and a plastic binder so that the coercive force will be greater than 1,000 Oersteds.

The magnetic poles are shown for purposes of illustration by the letters N and S. If driven shaft 30 is overloaded so that the magnetic repulsive force is not great enough to drive worm wheel B, it will be recognized that surface 20 of tooth 16 will contact surface 36 on teeth C to mechanically drive worm wheel B briefly until the overload is relieved. In the showing of FIG. 2, the magnetically effective repulsive surfaces are shown by cross hatching. It will be seen that the large dimensions and special shape of the magnetic worm gear drive provide a very large magnetic surface area. In the preferred arrangement, axial thickness 62 of worm wheel B is at least as great as diameter 60 of worm gear A.

Figure 3:
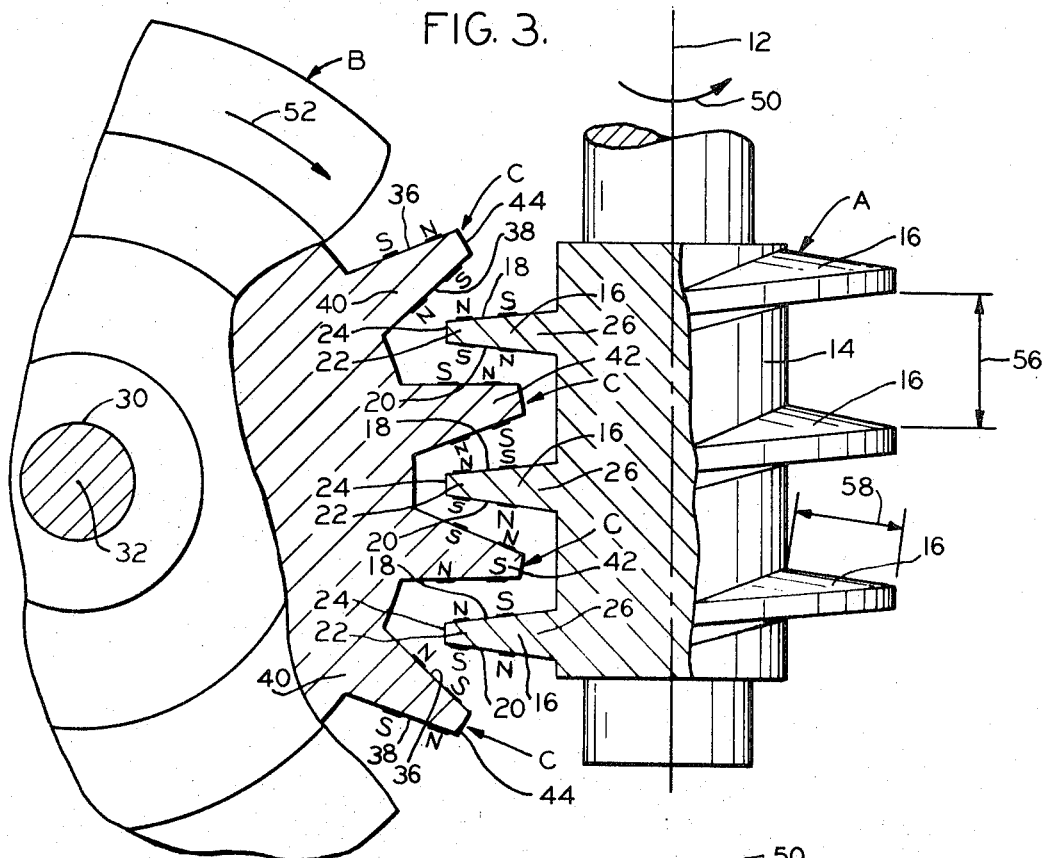
FIG. 3 is a view similar to FIG. 1 and showing another magneitc pole arrangement.

In accordance with another arrangement, the teeth may be magnetized as shown in FIG. 3. Tooth 16 is magnetized so that side surface 18 has a pair of spaced-apart magnetic poles of opposite polarity identified by letters N and S on the surface thereof. Likewise, side surface 20 has a pair of spaced-apart magnetic poles of opposite polarity identified by letters N and S. Each magnetic pole on side surfaces 18 and 20 is continuous and of helical shape along the entire length of tooth 16. Each tooth C is likewise magnetized so that surface 36 has a pair of spaced-apart arcuate poles identified by letters N and S, and surface 38 has a pair of spaced-apart arcuate poles of opposite polarity identified by letters N and S. Poles of common polarity on tooth 16 and teeth C face one another. Like the arrangement of FIG. 1, lines of magnetic force extend between adjacent poles of opposite polarity and also project outwardly from the side surfaces of the teeth. These lines of magnetic force interact to provide the repulsive driving force. With the arrangement of FIG. 3, the repulsive force is greater than in FIG. 1 because there is a smaller magnetic loss by scattering of the liner of magnetic force. Lines of magnetic force leaving one magnetic pole enter the opposite magnetic pole on the same surface in the air gap between facing surfaces on the teeth. This provides a highly concentrated repulsive force.

Figure 4:
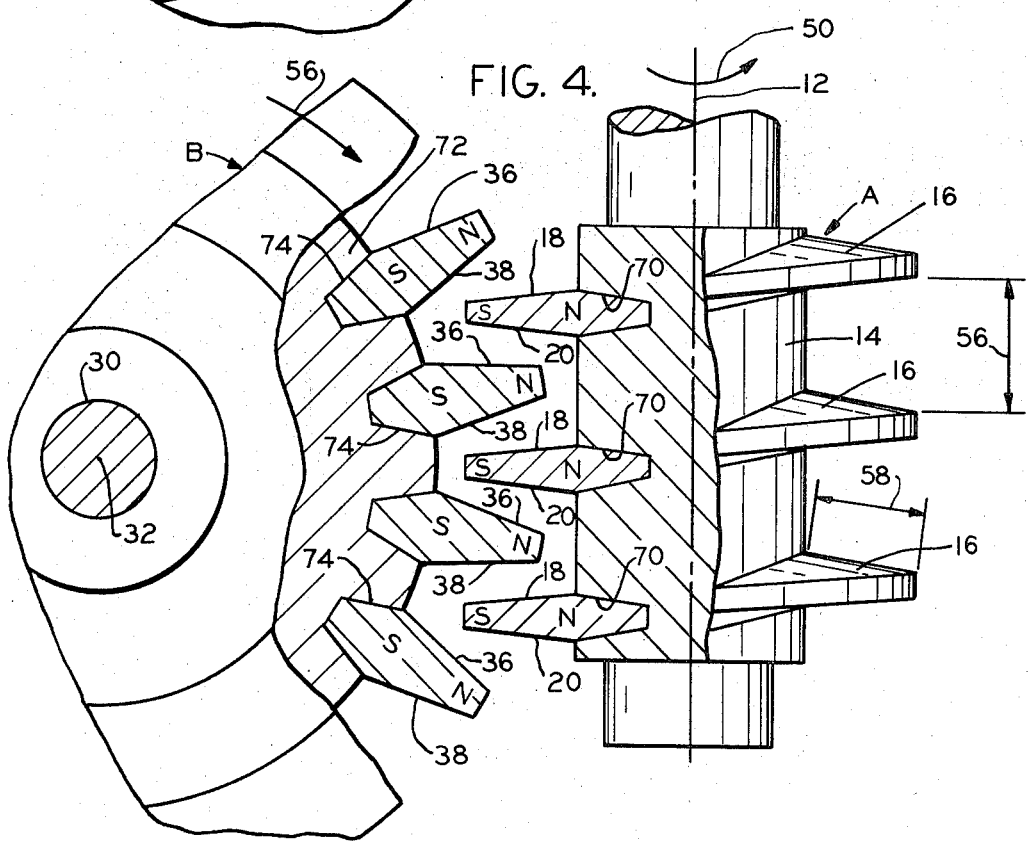
FIG. 4 is a view similar to FIGS. 1 and 3, and showing another magnetic pole arrangement.

In the arrangement of FIG. 4, hub 14 of worm gear A is formed with a helical groove 70. Hub 14 may be molded of non-magnetic material such as a polyamide. Tooth 16 may then be separately formed into a helical shape and screwed into groove 70. A suitable adhesive may be used for securely bonding tooth 16 to hub 14. Hub 72 of gear B may also be molded of non-mangetic material and provided with circumferentially spaced slots 74. Teeth C may then be molded separately and positioned in slots 74. Suitable adhesive may be used for bonding teeth C in slots 74.

FIG. 4 also shows another magnetization arrangement known in the prior art. See Faus 2,243,555. Outer portion 22 of tooth 16 is provided with a south magnetic pole while base portion 26 is provided with a north magnetic pole. Each tooth C has its outer portion 42 provided with a north magnetic pole and its base portion 40 provided with a south magnetic pole. Lines of magnetic force extending between the poles of opposite polarity also project outwardly of the side surfaces so that a repulsive force is produced. Poles of common polarity on tooth 16 also face poles of like polarity on teeth C. It will be recognized that the magnetization arrangements of FIGS. 1 and 3 may also be used in FIG. 4.

FIG. 5 shows a non-magnetic wear resistant coating 80 covering worm gear A and worm wheel B. Coating 80 may be applied by dipping, molding or spraying. Coating 80 may comprise a wax, lacquer or resin containing graphite or molybdenum di-sulfide. It will be recognized that it is also possible to provide such a coating 80 only on side surface 20 of tooth 16 and side surfaces 36 of teeth C because these are the surfaces that will engage to provide mechanical driving force when an overload occurs on worm wheel B. Coating 80 may be so applied to any of the embodiments of FIGS. 1-4.

In accordance with another aspect of the invention, as shown in FIG. 6, a binding element 82 may be applied over the outer surface of tooth 16. Binding element 82 may be a spiraled member of non-magnetic metal or glass reinforced plastic having a substantially U-shaped cross-sectional configuration. Binding element 82 is wound upon tooth 16 under tension so that tooth 16 is under substantially radial compression. Binding element 82 may be adhesively secured to tooth 16 or secured at its end portions by mechanical fastenings. At high rates of rotation, binding element 82 will hold tooth 16 together against the action of centrifugal force. Each tooth C may also be provided with such a binding element if so desired whereby each tooth C is under substantially radial compression. In this regard, binding element 82 defines a reinforcing element for reinforcing the tooth against damage. It is obvious that other reinforcing elements may be used. The entire outer surfaces of worm gear A and worm wheel B may be encased in a resin which may be reinforced with a glass yarn or the like for similar purpose. Such a coating would provide the non-magnetic wear resistant surface characteristics and also reinforce the teeth against damage.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the claims.

Having thus described my invention, I claim:

1. A magnetic worm gear including a continuous helical tooth of permanent magnet material having opposite side surface portions, said tooth being magnetized to provide at least a pair of continuous magnetic poles of opposite magnetic polarity one on each side surface between which pole lines of magnetic force extend and project outwardly of said side surface portions.

2. The gear of claim 1 wherein substantially the entire surface of one of said side surface portions defines one of said magnetic poles and substantially the entire surface of the other of said side surface portions defines the other of said magnetic poles.

3. The gear of claim 1 wherein there are a first pair of spaced-apart magnetic poles of opposite polarity on one of said side surfaces and a second pair of spaced-apart magnetic poles of opposite polarity on the other of said side surfaces.

4. The gear of claim 1 wherein said gear includes a core of non-magnetic material.

5. The gear of claim 1 and further including a coating of non-magnetic wear resistant material on at least said side surface portions.

6. The gear of claim 1 and further including binding means on said helical tooth for holding said tooth together against action of centrifugal force during high speed rotation of said gear.

7. The gear of claim 1 and further including a worm wheel having a plurality of worm wheel teeth of permanent magnet material including opposite side surfaces, each of said worm wheel teeth being magnetized to provide at least a pair of magnetic poles of opposite polarity thereon one on each side surface between which lines of magnetic force extend and project outwardly of said side surfaces thereof, said helical tooth and worm wheel teeth being interdigitated whereby said lines of magnetic force repulse one another for rotatably driving said worm wheel by magnetic repulsion upon rotation of said worm gear.

8. A magnetic gear including a plurality of circumferentially-spaced teeth of permanent magnet material having opposite side surfaces, each of said teeth being magnetized to provide at least a pair of magnetic poles of opposite polarity one on each side surface between which lines of magnetic force extend and project outwardly of said side surfaces.

9. The gear of claim 8 wherein substantially the entire surface of one of said side surfaces defines one of said magnetic poles and substantially the entire surface of the other of said side surfaces defines the other of said magnetic poles.

10. The gear of claim 8 wherein there are a first pair of spaced-apart magnetic poles of opposite polarity on one of said side surfaces and a second pair of spaced-apart magnetic poles of opposite polarity on the other of said side surfaces.

11. The gear of claim 8 and further including a covering of non-magnetic wear resistant material on said teeth.

* * * * *